(12) United States Patent
Thibeault et al.

(10) Patent No.: US 10,027,588 B2
(45) Date of Patent: Jul. 17, 2018

(54) DYNAMIC LOAD BALANCING UNDER PARTIAL SERVICE CONDITIONS

(71) Applicant: ARRIS Technology, Inc., Suwanee, GA (US)

(72) Inventors: Brian K. Thibeault, Attleboro, MA (US); Andrew S. Carle, Franklin, MA (US); Sarah S. Mak, Ashland, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 6 days.

(21) Appl. No.: 14/924,920

(22) Filed: Oct. 28, 2015

(65) Prior Publication Data

US 2016/0050154 A1 Feb. 18, 2016

Related U.S. Application Data

(62) Division of application No. 13/728,220, filed on Dec. 27, 2012, now Pat. No. 9,203,639.

(51) Int. Cl.
*H04L 12/803* (2013.01)
*H04L 12/801* (2013.01)
(Continued)

(52) U.S. Cl.
CPC .......... *H04L 47/125* (2013.01); *H04L 5/0044* (2013.01); *H04L 12/2863* (2013.01);
(Continued)

(58) Field of Classification Search
CPC ..... H04L 47/12; H04L 47/125; H04L 5/0044; H04L 12/2863; H04L 43/08; Y02B 60/33
See application file for complete search history.

(56) References Cited

U.S. PATENT DOCUMENTS 3,838,221 A 9/1974 Schmidt et al.
4,245,342 A 1/1981 Entenman
(Continued)

FOREIGN PATENT DOCUMENTS

| DE | 69631420 T2 | 12/2004 |
| EP | 1235402 A2 | 8/2002 |
| EP | 1341335 A2 | 9/2003 |
| JP | 55132161 A | 10/1980 |

(Continued)

OTHER PUBLICATIONS

Volpe, B., and Miller, W., "Cable-Tec Expo 2011: Advanced Troubleshooting in a DOCSIS© 3.0 Plant," Nov. 14-17, 2011, pp. 17.

(Continued)

*Primary Examiner* — Yemane Mesfin
*Assistant Examiner* — Peter Chen
(74) *Attorney, Agent, or Firm* — Lori Anne D. Swanson (57) ABSTRACT

Methods and apparatuses for controlling load balancing of modems may include receiving an indication of impairment of a channel, placing modems using the impaired channel into a partial service mode and removing the impaired channel from a list of channels available for load balancing, monitoring the quality of the impaired channel, and, responsive to detection of acceptable quality on the impaired channel, removing the modems from partial service mode and adding the channel back to the list of channels available for load balancing. Another method includes, but is not limited to, receiving an indication of a partial service mode for a modem, incrementing a partial service mode counter for a channel associated with the partial service mode indication, computing a partial service mode metric based in part upon the partial service mode counter, and responsive to a determination that the partial service mode metric meets a threshold, determining an allocation of modems to channels.

14 Claims, 5 Drawing Sheets

(51) Int. Cl.
*H04L 12/26* (2006.01)
*H04L 12/28* (2006.01)
*H04L 5/00* (2006.01)

(52) U.S. Cl.
CPC .............. *H04L 43/08* (2013.01); *H04L 47/12* (2013.01); *Y02D 50/30* (2018.01)

(56) References Cited

U.S. PATENT DOCUMENTS

| | | | |
|---|---|---|---|
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan |
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,694,437 A | 12/1997 | Yang et al. |
| 5,732,104 A | 3/1998 | Brown et al. |
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al Araji et al. |
| 6,556,562 B1 | 4/2003 | Bhagavath et al. |
| 6,556,660 B1 | 4/2003 | Li et al. |
| 6,559,756 B2 | 5/2003 | Al Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhunj et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,778,314 B2 | 8/2010 | Wajcer et al. |
| 7,787,557 B2 | 8/2010 | Kim et al. |
| 7,792,183 B2 | 9/2010 | Massey et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |

(56) References Cited

U.S. PATENT DOCUMENTS

| | | |
|---|---|---|
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,310,926 B1 * | 11/2012 | Bernstein ............ H04L 12/2801 370/230 |
| 8,345,557 B2 | 1/2013 | Thibeault et al. |
| 8,788,647 B1 | 7/2014 | Nolle et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0202202 A1 | 10/2004 | Kolze et al. |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0249421 A1 | 10/2009 | Liu et al. |
| 2010/0014425 A1 | 1/2010 | Cheng et al. |
| 2010/0083356 A1 | 4/2010 | Steckley et al. |
| 2010/0095360 A1 | 4/2010 | Pavlovski et al. |
| 2010/0154017 A1 * | 6/2010 | An ...................... H04L 12/2801 725/111 |
| 2010/0157824 A1 | 6/2010 | Thompson et al. |
| 2010/0158093 A1 | 6/2010 | Thompson et al. |
| 2010/0223650 A1 | 9/2010 | Millet et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0080868 A1 | 4/2011 | Krishnaswamy et al. |
| 2011/0110415 A1 | 5/2011 | Cooper et al. |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0206103 A1 * | 8/2011 | Beser .................. H04L 12/2801 375/222 |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |
| 2013/0088961 A1 * | 4/2013 | Ramachandran ..... H04L 47/125 370/235 |

FOREIGN PATENT DOCUMENTS

| | | |
|---|---|---|
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |

OTHER PUBLICATIONS

Wolcott, L., "Modem Signal Usage and Fault Isolation," U.S. Appl. No. 61/301,835, filed Feb. 5, 2010.

(56) References Cited

OTHER PUBLICATIONS

Zhao, F., et al., "Techniques for minimizing error propagation in decision feedback detectors for recording channels," IEEE Transactions on Magnetics, vol. 37, No. 1, Jan. 2001, pp. 12.
B. Volpe, "DOCSIS 3.0 Partial Service", The Volpe Firm, Dec. 7, 2011, retrieved from the Internet at <http://volpefirm.com/docsis-3-0-partial-service/? on Mar. 24, 2015.
"A Simple Algorithm for Fault Localization Using Naming Convention and Micro-reflection Signature," Invention Disclosure 60193, Cable Television Laboratories, Inc., Jun. 2008, p. 2.
"Data-Over-Cable Service Interface Specifications DOCSIS 3.0: MAC and Upper Layer Protocols Interface," CM-SP-MULPIv3.0-I16-110623, Cable Television Laboratories, Inc., Jun. 2011, section 8, pp. 242-266.
"Data-Over-Cable Service Interface Specifications DOCSIS® 3.0—MAC and Upper Layer Protocols Interface Specification," CM-SP-MULPIv3.0-I17-111117, Cable Television Laboratories, Inc., Nov. 17, 2011, pp. 770.
"DOCSIS Best Practices and Guidelines; Proactive Network Maintenance Using Pre-Equalization," CM-GL-PNMP-V01-100415, Cable Television Laboratories, Inc., pp. 123.
"Pre-Equalization Based Pro-active Network Maintenance Process Model for CMs Transmitting on Multiple Upstream Channels," Invention Disclosure 60203, Cable Television Laboratories, Inc., May 2009, pp. 2.
"Pre-Equalization based pro-active network maintenance process model," Invention Disclosure 60177, Cable Television Laboratories, Inc., Jun. 2008, pp. 2.
"Proactive Network Maintenance Using Pre-Equalization," DOCSIS Best Practices and Guidelines, Cable Television Laboratories Inc., CM-GL-PNMP-V02-110623, Jun. 23, 2011, pp. 133.
"Radio Frequency Interface Specification," Cable Television Laboratories, Inc., Data-Over-Cable Service Interface Specifications DOCSIS 2.0, CM-SP-RFIv2.0-I06-040804, pp. 524.
Campos, L. A., et al., "Pre-equalization based Pro-active Network Maintenance Methodology," Cable Television Laboratories, Inc., (presentation), 2012, pp. 32.
Howald, R. L., et al., "Customized Broadband—Analysis Techniques For Blended Multiplexes," pp. 12.
Howald, R., "Access Networks Solutions: Introduction to S-CDMA," Presentation to Society of Cable Telecommunications Engineers (SCTE) South Florida Chapter, Motorola, Inc., 2009, pp. 15.
Howald, R., "Upstream Snapshots & Indicators (2009)," Regional Samples, Presentation to Society of Cable Telecommunications Engineers (SCTE) South Florida Chapter, Jan. 2010, pp. 22.
Howald, R., et al., "Characterizing and Aligning the HFC Return Path for Successful DOCSIS 3.0 Rollouts," Society of Cable Telecommunications Engineers (SCTE) Cable Tee Expo, Oct. 2009, pp. 66.
Howald, R., et al., "Docsis 3.0 Upstream: Readiness & Qualification," pp. 17.
Howald, R., et al., "The Grown-Up Potential of a Teenage Phy," pp. 65.
Howald, R.,"DOCSIS 3.0 Upstream: Technology, RF Variables & Case Studies," Access Networks Solutions, 2009, presentation to Society of Cable Telecommunications Engineers (SCTE) South Florida Chapter, Jan. 2010, pp. 23.
Hranac, R., "Linear Distortions, Part 1," Communication Technology, Jul. 1, 2005, accessed at www.cable360.net/print/ct/operations/testing/15131.html, pp. 6.
Liu, X., and Bernstein, A., "Variable Bit Rate Video Services in DOCSIS 3.0 Networks," NCTA Technical Papers, 2008, pp. 12.
Motorola., "White Paper: Expanding Bandwidth Using Advanced Spectrum Management," Sep. 25, 2003, pp. 12.
Newton's Telecom Dictionary, Sep. 1995, Flatiron Publishing, 9th Edition, pp. 216 and 1023, definitions of "carrier to noise ratio" and "signal to noise ratio".
Patrick, M., and Joyce, G., "Delivering Economical IP Video over DOCSIS by Bypassing the M-CMTS with DIBA," SCTE 2007 Emerging Technologies, Topic Subject: Service Velocity & Next Generation Architectures: How Do We Get There?, 2007, pp. 17.
Popper, A., et al, "An Advanced Receiver with Interference Cancellation for Broadband Cable Networks," Juniper Networks, International Zurich Seminar on Broadband Communications Access 2002, pp. 23-1-23-6.
Popper, A., et al, "Ingress Noise Cancellation for the Upstream Channel in Broadband Cable Access Systems," Juniper Networks, IEEE International Conference on Communications 2002, vol. 3, pp. 1808-1812.
Qureshi, S. U. H., "Adaptive Equalization," IEEE, vol. 73, No. 9, Sep. 1985, pp. 1349-1387.
Ramakrishnan, S., "Scaling the DOCSIS Network for IPTV," Cisco Systems, Inc., SCTE Conference on Emerging Technologies and the NCTA Cable Show, 2009, pp. 19.
Shelke, Y. R., "Knowledge Based Topology Discovery and Geo-localization," Thesis, 2010, pp. 173.
Thompson, R., et al., "256-QAM for Upstream HFC," Spring Technical Forum Proceedings, 2010, pp. 142-152.
Thompson, R., et al., "256-QAM for Upstream HFD Part Two," SCTE Cable Tec Expo 2011, Technical Paper, pp. 22.
Thompson, R., et al., "Multiple Access Made Easy," SCTE Cable Tec Expo 2011, Technical Paper, pp. 23.
Thompson, R., et al., "Optimizing Upstream Throughput Using Equalization Coefficient Analysis," National Cable & Telecommunications Association (NCTA) Technical Papers, Apr. 2009, pp. 35.
Thompson, R., et al., "Practical Considerations for Migrating the Network Toward All-Digital," Society of Cable Telecommunications Engineers (SCTE) Cable-Tec Expo, Oct. 2009, pp. 22.
Thompson, R., et al., "64-QAM, 6.4MHz Upstream Deployment Challenges," SCTE Canadian Summit, Toronto, Canada, Technical Paper, Mar. 2011, pp. 25.
Ulm, J., et al., "Flexible Channel Bonding for IP Video Delivery Disclosure," pp. 8.

\* cited by examiner

DYNAMIC LOAD BALANCING UNDER PARTIAL SERVICE CONDITIONS

CROSS-REFERENCE TO RELATED APPLICATION

This application is a divisional of U.S. patent application Ser. No. 13/728,220 filed on Dec. 27, 2012, entitled "Improved Dynamic Load Balancing Under Partial Service Conditions," now issued as U.S. Pat. No. 9,203,639, the contents of which is incorporated herein by reference in its entirety.

FIELD

The field of this disclosure relates to load balancing of a set of modems in a network and, more particularly, relates to deferring load balancing under certain partial service conditions.

BACKGROUND

A typical cable network comprises a head end, which communicates with a cable modem termination system (CMTS) containing multiple transmitters and receivers. Each transmitter and receiver generally communicates with multiple cable modems (CMs) via a coaxial cable or hybrid fiber-coaxial network. The bandwidth between a CM and the CMTS is divided into a set of channels. For each node in the network, a receiver at the CMTS is generally allocated to each upstream channel that is in use, and a transmitter is allocated to each downstream channel.

Channel bonding in cable modems entered mainstream use with the introduction of the DOCSIS 3.0 specification. One or more bonded channels may be allocated to one or more of the CMs in communication with a CMTS. At times, the bonded channel(s) may become unsuitable for communication. To operate under these conditions, CMs may enter a partial service mode and discontinue use of the problematic channel, while continuing to operate using the remaining channels. The CM may continue ranging on the problematic channel, however, waiting for the partial service condition to be resolved such that it may again pass data on the channel.

A load balancing manager, detecting that there is little or no traffic on the channel impacted by a partial service condition, may consider the channel to be underutilized and actually assign additional modems to that channel. CMs newly moved by the load balancer to a bonding group that includes the channel impacted by the partial service condition may then also enter partial service mode because of the problem. Thus, the throughput of the CMs would be reduced, not increased, by the balancing operation. As the newly added modems also cease to pass traffic, the load balancer may be led to add more modems still to the impacted channel. Furthermore, modems entering partial service mode may shift more traffic to their other channels, potentially overloading those channels and starving modems for which only a single channel is available. When the CMs come out of partial service mode, the formerly impacted channel may quickly become overloaded, requiring further channel reallocations.

Thus, channel allocations using current load balancing techniques may not only be inefficient, but may also increase the chances of disruption of data and voice traffic.

DETAILED DESCRIPTION

Disclosed herein are improved load balancing techniques, particularly in the presence of devices operating in a partial service mode. For example, the disclosed techniques may account for modems in partial service mode in the determination of whether to perform load balancing. Improving load balancing to account for partial service mode modems may reduce the number of problems that result from unnecessary or counterproductive modem moves, such as reduction of throughput, de-registration, and loss of data or voice traffic.

In embodiments, the method comprises, but is not limited to: receiving an indication of impairment of a channel, placing modems using the impaired channel into a partial service mode and removing the channel from a list of channels available for load balancing, monitoring the quality of the impaired channel, and, responsive to detection of acceptable quality on the impaired channel, removing the modems from partial service mode and adding the channel to a list of channels available for load balancing. By accounting for the impaired channel, the method prevents load balancing assignment of additional modems to the impaired channel, thereby avoiding unnecessary moves of modems and reducing the associated risk of data loss or disruption of transmissions that would occur under prior art load balancing methods.

In embodiments, the method comprises, but is not limited to: receiving an indication of a partial service mode for a first modem of a plurality of modems, incrementing a partial service mode counter for a first channel of the plurality of channels associated with the partial service mode indication responsive to the indication of the partial service mode, computing a partial service mode metric based in part upon the partial service mode counter, and, responsive to a determination that the partial service mode metric meets a threshold, determining an allocation of the plurality of modems to the plurality of channels, including the first channel. By accounting for the modems in partial service mode, the method avoids generating new load balancing channel allocations that would be counter-productive once those modems leave partial service mode, thereby avoiding unnecessary moves of modems and reducing the associated risk of data loss or disruption of transmissions that would occur under prior art load balancing methods.

In embodiments, the improved load balancing is performed by an apparatus comprising, but not limited to: a plurality of receivers for receiving data transmitted from a plurality of modems or a plurality of transmitters for transmitting data to a plurality of modems, a memory for storing a list of channels available for load balancing, and a processor for performing: receiving an indication of impairment of a channel, placing a plurality of modems using the impaired channel into a partial service mode and removing the channel from the list of channels available for load balancing, monitoring the quality of the impaired channel, and responsive to detection of acceptable quality on the impaired channel, removing the plurality of modems from a partial service mode and adding the channel to the list of channels available for load balancing.

Figure 1:
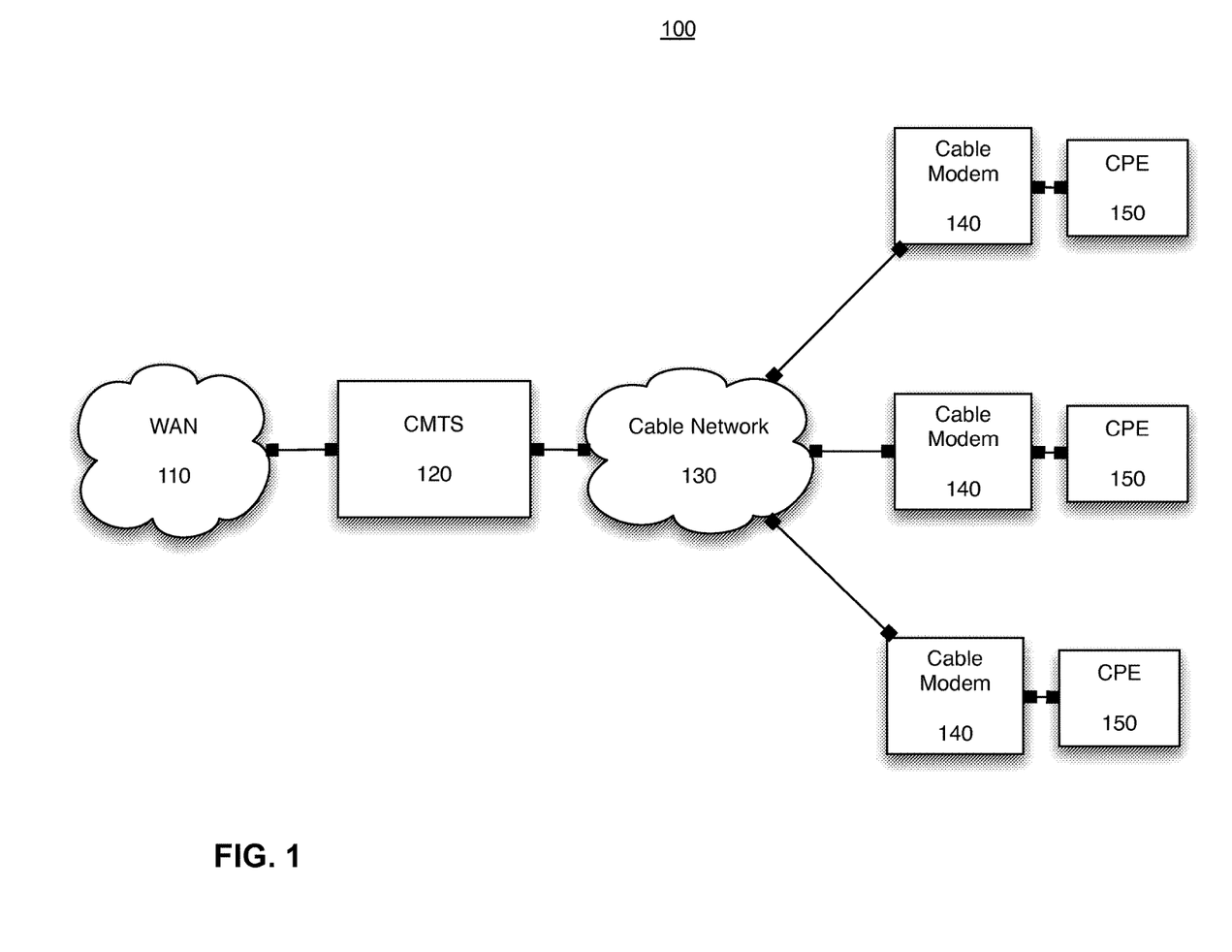
FIG. 1 is an exemplary schematic representation of a bi-directional cable system.

FIG. 1 is an exemplary schematic representation of a bi-directional cable system. The cable modem termination system (CMTS) 120 communicates Internet Protocol (IP) traffic to and from a wide area network (WAN) 110, and to and from subscriber cable modems (CMs) 140 over the cable network 130. Cable network 130 may commonly be a coaxial network or hybrid fiber-coaxial (HFC) network. Cable modems 140 are connected directly or via wired or wireless local area networks (LANs) to customer premises equipment (CPE) 150.

Those of skill in the art will appreciate that "CMTS" generally refers to any suitable modem termination system, that the architecture illustrated is exemplary, and that any type of cabling may be used, such as coaxial wires, optical fibers, twisted pairs, and wireless connections. Upstream and downstream communications may be handled by the same or different processors, transceivers, and cabling. In embodiments, the CMTS comprises a Motorola BSR 64000 I-CMTS Chassis housing multiple Motorola RX 48 Decoupled Upstream Modules and Motorola TX 32 Decoupled Downstream Modules. In embodiments, the receiver or transmitter may be part of a combined video and data services platform. In embodiments, the CMs comprise Motorola SURFboard SB6120, SB6121, or SBG6580 modems.

The bandwidth between a CM 140 and the CMTS 120, such as those shown in FIG. 1, is divided into a set of channels. For each node in the network, a receiver 270 at the CMTS 120 is generally allocated to each upstream channel that is in use, and a transmitter is allocated to each downstream channel. The bandwidth available over each channel may be limited. Furthermore, the number of channels is generally much smaller than the number of connected CMs 140. Thus, multiple CMs 140 may share each channel. Sharing of a channel may be accomplished, for instance, using variants of time division multiple access (TDMA) or code division multiple access (CDMA) channel access methods.

In some cases, the full the bandwidth of a single channel may be insufficient to provide a desired level of service. Additionally, jitter and latency on a channel can greatly impact quality of service, particularly for voice and video services. Channel bonding may provide throughput and reduce transmission delays through the concurrent use of multiple channels. Channel bonding in cable modems entered mainstream use with the introduction of the DOCSIS 3.0 specification. A bonded CM 140 may send and receive data traffic on multiple channels in parallel, to and from the CMTS 120, allowing higher-speed operation. Furthermore, packet delays may be reduced since individual data packets may be segmented for transmission over the multiple channels and reassembled at the destination, reducing the transmission time for the packet.

At times, one or more of the bonded channels allocated to one or more of the CMs 140 in communication with a CMTS 120 may become unsuitable for communication. The communication problem may be caused by a localized hardware or software issue, affecting a subset of CMs 140 using the channel, or by general channel impairment, affecting all CMs 140 on the channel.

To operate under these conditions, CMs 140 may enter a "partial service mode." In partial service mode, a CM 140 discontinues use of the problematic channel and continues operating using the remaining channels. The CM 140 may continue ranging on the problematic channel, however, waiting for the partial service condition to be resolved such that it may again pass data on the channel.

Utilization of certain channels can become higher than desired due to either the number of CMs 140 on the channel or the volume of data being passed by those CMs 140. Thus, cable operators may employ load balancing techniques to equalize traffic, generally balancing modem count or utilization across the available channels.

Load balancing is a feature of the CMTS 120 that controls dynamic changes to the set of downstream and upstream channels used by a CM 140. A Load Balancing Group (LBG) is a set of upstream and downstream channels over which a CMTS performs load balancing for a set of CMs. The CMTS generally attempts to balance load among all of the channels of each LBG. In cases where a single channel, upstream or downstream, is associated with more than one LBG, the CMTS might have to consider all LBGs for which such overlaps exist in its load balancing algorithm. In DOCSIS 3.0 environments, the CMTS may perform load balancing by using Dynamic Channel Change (DCC) or Dynamic Bonding Change (DBC) messages, by changing the Receive Channel Set (RCS) of the CM, by moving one or more service flows to different downstream channels within the current RCS of the CM, by changing the Transmit Channel Set (TCS) of the CM, or by moving one or more service flows to different upstream channels within the current TCS of the CM. The DOCSIS 3.0 specification currently does not place requirements on the specific algorithms used by the CMTS for load balancing, nor does it make a statement regarding the definition of "balanced" load. CMTS vendors are free to develop appropriate algorithms in order to meet market and deployment needs.

Figure 2:
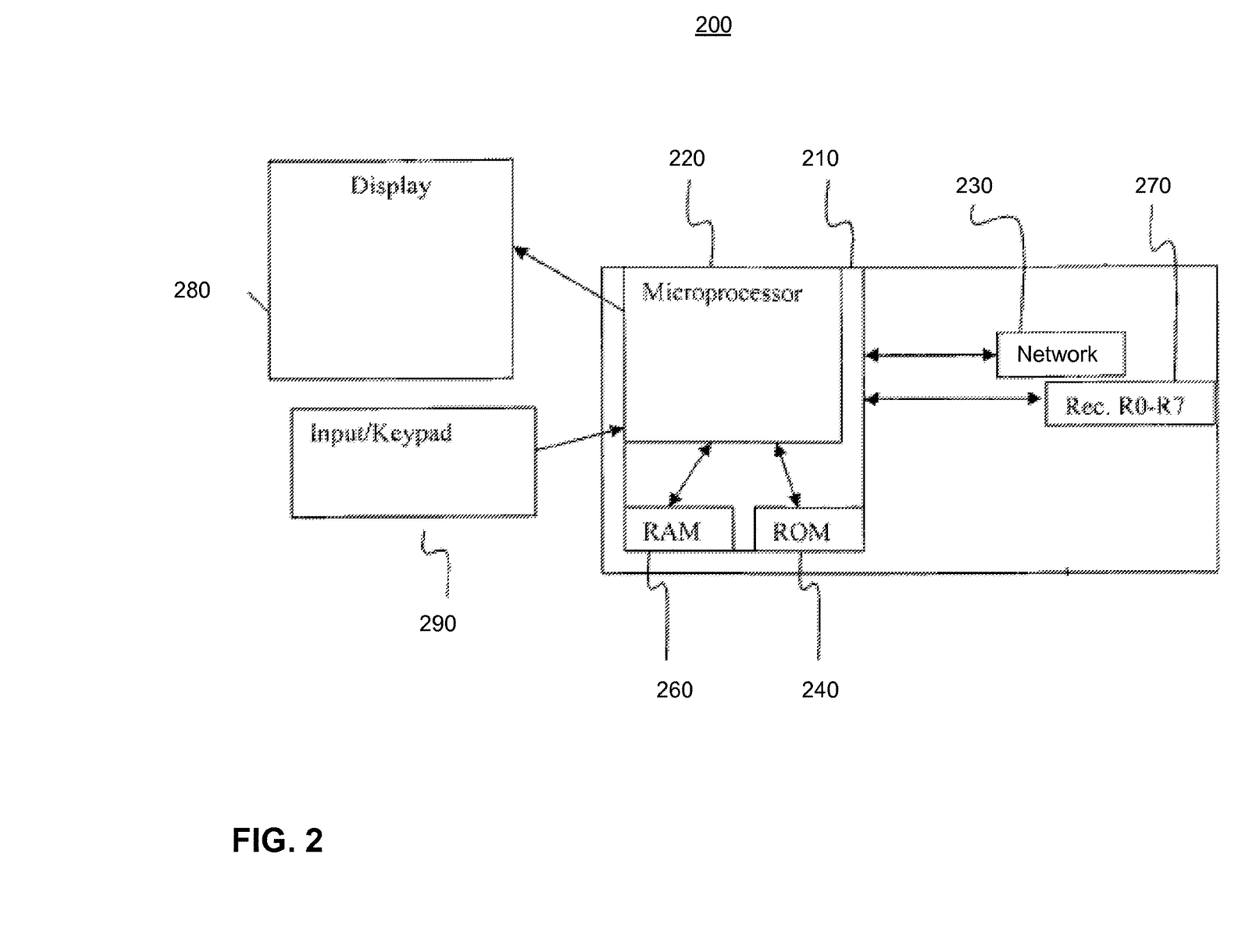
FIG. 2 illustrates an exemplary upstream module of a cable modem termination system.

FIG. 2 illustrates an exemplary upstream module 200 of a CMTS 120 of FIG. 1. The upstream module 200 may perform various methods to control load balancing, which are adapted to account for partial service mode conditions. Processing unit 210 may include a microprocessor 220 for receiving information, such as instructions and data, from a ROM 240 or RAM 260. Upstream module 200 may also comprise a network module 230 for communications with other CMTS elements, such as corresponding downstream modules. Receivers 270 allow reception of data from CMs, including user data and control data, which may include indications of partial service mode conditions. The receiver portion of upstream module 200 may comprise multiple connectors, RF switches, tuners, and RF receivers. For example, the Motorola RX48 BSR 64000 Decoupled Upstream Module, which may be adapted for use with the disclosed techniques, provides eight physical RF ports, each with six upstream QAM receivers. In a corresponding exemplary downstream module, such as the Motorola TX32 BSR 64000 Decoupled Downstream Module, element 270 would be replaced with a transmission section. In other implementations, receivers and transmitters may be combined on the same card.

Processing unit 210 may be connected, directly or over a network, to a display 280, which may display status information. An input keypad 290 may also be connected, directly or indirectly, to processing unit 210 and may allow an operator to provide instructions, processing requests and/or data to upstream module 200. ROM 240 and/or RAM 260 may also carry instructions for microprocessor 220 to perform the processes illustrated in any or all of the following figures. Furthermore, any of the processes described below may be contained on a computer readable medium, which may be read by microprocessor 220. A computer readable medium may be any tangible storage medium capable of carrying instructions to be performed by a microprocessor, including a CD disc, DVD disc, magnetic or optical disc, tape, silicon based removable or non-removable memory. While microprocessor 220 is shown as being associated with an exemplary upstream module, it is understood that a common microprocessor may be shared amongst multiple upstream modules or combinations of upstream and downstream modules in CMTS 120.

As described above, performing load balancing when a significant number of modems are in a partial service mode can be counterproductive. Disclosed are embodiments for controlling the load balancing of modems, which account for modems in partial service mode.

Conditions causing entry into a partial service mode may be detected either by the CMTS 120 or by individual modems 140. In the first case, the load balancing manager may work in conjunction with a spectrum manager process, or other CMTS process, to monitor channel quality. If the spectrum manager detects that a particular channel is impaired, all of the CMs 140 using that channel may be put into partial service mode by the CMTS 120. However, this may cause the data utilization on that channel to be reduced, leading a normal load balancing algorithm to add CMs to that channel in an attempt to balance loads.

Figure 3:
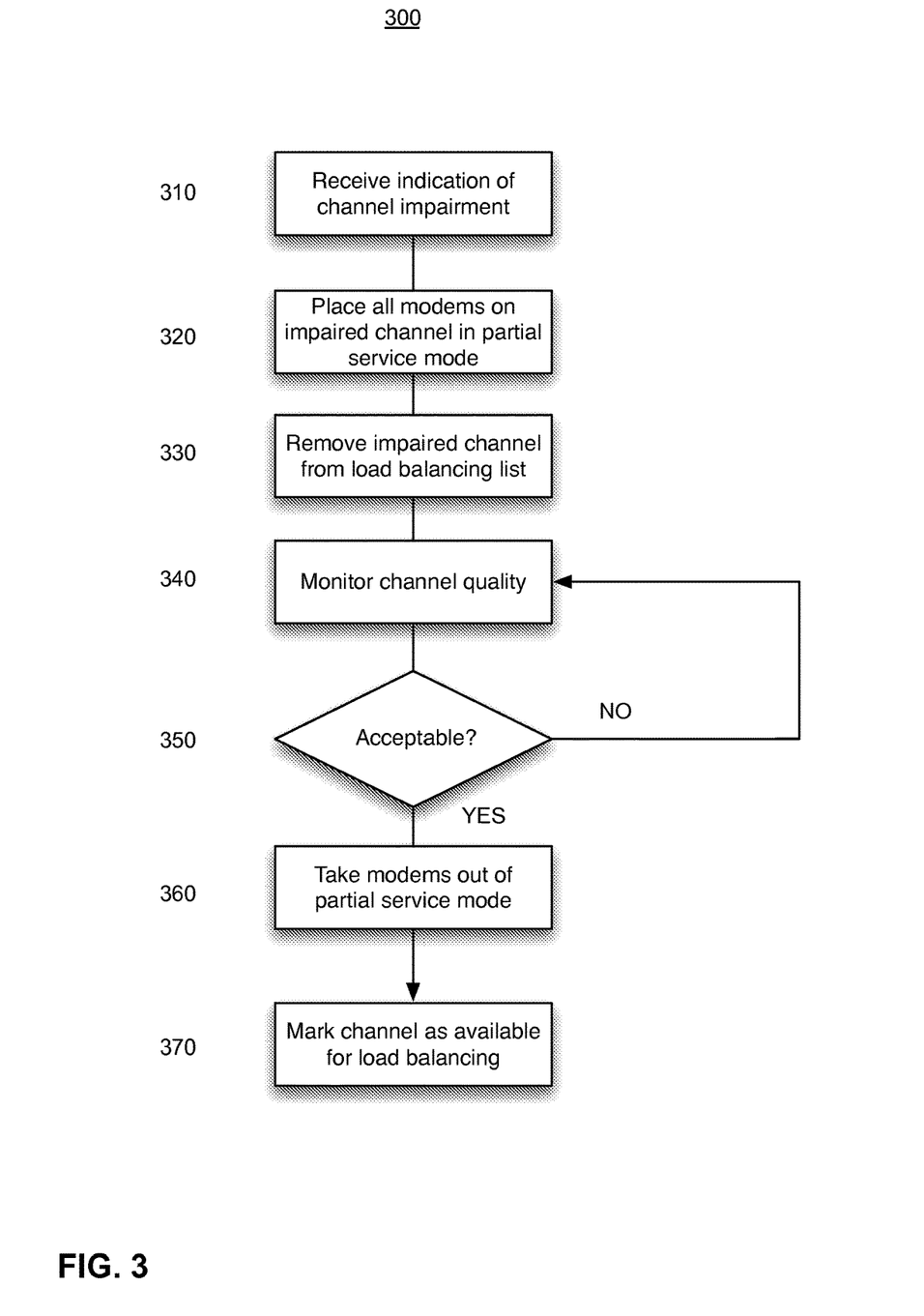
FIG. 3 is a flowchart of a method for controlling the load balancing of a set of modems, wherein the method accounts for an impaired channel.

To address this problem, an improved load balancing method is desirable. FIG. 3 is a flowchart of such an improved method 300 for controlling the load balancing of modems, which accounts for a channel being impaired. The method may be performed within a CMTS 120, or particularly within an upstream module 200, a downstream module, or a combined upstream/downstream unit. Program code for the method may be stored on ROM 240 and/or RAM 260, and may be executed by microprocessor 220.

At 310, the CMTS 120 receives an indication of an impairment of one of the communication channels used for communications with CMs 140. The indication may be received from a process running on microprocessor 220, such as a spectrum management process, when a channel is determined to be impaired. The spectrum management process may generate the indication of impairment based upon information received from receivers or transmitters 270. The detection of impairment may be based upon metrics such as signal strength, signal-to-noise ratio, detected errors, or other indications generated by hardware or software.

At 320, the CMTS 120 places all modems associated with the impaired channel into a partial service mode. The CMTS 120 may accomplish this via the microprocessor 220 sending control messages to each of the affected CMs 140 via transmitters or network interface 230. The control messages may be sent to the CMs 140 using the modulation used for regular data transmission, such as 8-QAM, 16-QAM, 32-QAM, 64-QAM, 128-QAM, or 256-QAM, or using a different, more robust modulation scheme such as quadrature phase-shift keying (QPSK). The message may be sent via the regular data transmission path or via a separate control channel.

The entry of CMs into partial service mode may lead to an increase in traffic on the remaining non-impaired channels allocated to those modems. For instance, in a DOCSIS 3.0-capable system where the DOCSIS 3.0 modems each use two bonded channels, an impairment of one channel, and subsequent entry of those modems into partial service mode, will cause those modems to shift more of their traffic to their other channel.

At 330, the impaired channel is removed from the list of channels available to the load balancing process. With the impaired channel removed, CMs will not be moved by the load balancer to the impaired channel or to a bonding group containing the impaired channel. Channel availability may be stored as an array, or in another suitable form, in RAM or other memory accessible to the load balancing manager process. The actions of 320 and 330 may take place in either order or in parallel.

At 340, the quality of the impaired channel is monitored. The monitoring may be performed by a spectrum manager or other process on the CMTS 120. Metrics such as signal strength, signal-to-noise ratio, or detected errors, may be used in the monitoring. Monitoring signals may be generated by hardware, software, or a combination of the two.

At 350, the results of the monitoring of 340 are assessed. If the channel quality is deemed to be acceptable, the algorithm proceeds to 360 and those modems placed in partial service mode due to the channel impairment are taken out of partial service mode. At 370, the channel removed from the load balancing list at 330 is marked as being available again for use in load balancing. The actions of 360 and 370 may take place in either order, or in parallel.

If, at 350, the channel quality is still unacceptable, the algorithm returns to 340 for further monitoring. Thus, load balancing involving the impaired channel is delayed until the impairment is resolved and counterproductive moves of modems to the impaired channel are prevented.

The method of FIG. 3 may be performed by an apparatus such as the upstream module 200 of FIG. 2. The receivers 270 may receive data transmitted from modems on a plurality of channels. A random access memory 260 may store a list of channels available for load balancing. Microprocessor 220 may receive an indication of impairment of at least one channel. Responsive to the indication of impairment of the channel, the CMTS 120 may place those modems using the impaired channel into a partial service mode and remove the impaired channel from the list of channels available for load balancing. The microprocessor 220 may then monitor the quality of the impaired channel, or monitor indicators of the quality received from another component, and, responsive to detection of acceptable quality on the impaired channel, remove the modems from partial service mode and add the channel back to the list of channels available for load balancing. Program code related to execution of the method may be stored in RAM 260, ROM 240, or other memory.

In the example of FIG. 3, channel impairment is detected by the CMTS 120, generally affecting all CMs 140 that are using the impaired channel. In other cases, however, modems themselves detect problems, which may or may not be affecting other CMs, which necessitate entry into a partial service mode. These problems may be caused by localized noise issues, ranging issues, faulty splitters, or other software or hardware failures or malfunctions within the customer premises or in the network. Different methods are needed to address these cases, which may depend upon the load balancing technique being used.

One particular technique for load balancing is the balancing of modem counts across channels. If an assumption is made that sets of modems will, on average, produce, or consume, similar amounts of traffic, equalizing the numbers of modems on each channel would result in balanced utilization. Load balancing in this scenario is performed by moving modems between channels to balance the modem counts. When the difference in the number of modems between channels exceeds a threshold, modems are moved to rebalance the system.

As described above, modems in partial service mode may not appear to be using a channel, while in fact, they are in the process of ranging and could resume transmission on that channel in a short time. Performing load balancing using prior art algorithms that fail to account for the modems in partial service mode may therefore be counterproductive and lead to a worse load imbalance in the near future.

To address this problem, the load balancing manager may store a counter for each channel to keep track of the number of modems currently in partial service. When load balancing is triggered, the number of modems considered to be using each channel during the modem count comparison will be adjusted to include the modems in partial service. By including the partial service modems in the calculation, the load balancing manager will be less likely to initiate unnecessary modem moves that would likely need to be reversed when modems come out of partial service.

Figure 4:
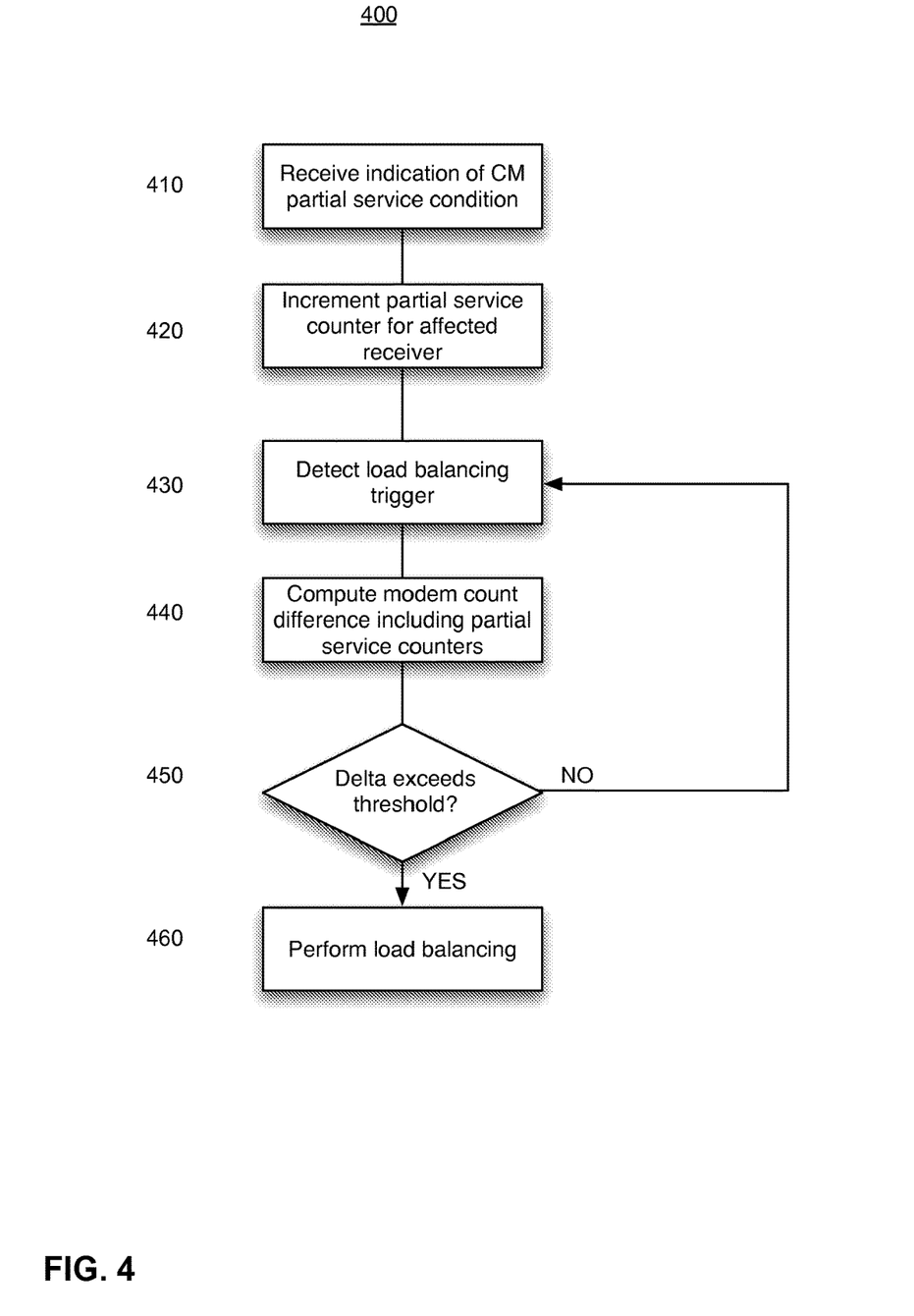
FIG. 4 is a flowchart of a method for controlling the load balancing of a set of modems by balancing modem counts, wherein the method accounts for partial service mode modems.

FIG. 4 is a flowchart of such a method 400 for controlling the load balancing of CMs, which accounts for partial service mode CMs. The method may be performed within a CMTS 120, or particularly within an upstream module 200, a downstream module, or a combined upstream/downstream unit. Program code for the method may be stored on ROM 240 and/or RAM 260, and may be executed by microprocessor 220.

At 410, the CMTS 120 receives an indication of a partial service mode for one of the modems. The indication may be received directly from the modem 140, as described above, due to detection by the modem of any inability to communicate effectively on one or more of its channels. The control messages may be sent to the CMTS 120 by the CM 140 using the modulation used for regular data transmission, such as 8-QAM, 16-QAM, 32-QAM, 64-QAM, 128-QAM, or 256-QAM, or using a different, more robust modulation scheme such as quadrature phase-shift keying (QPSK). The message may be received via the regular data transmission path or via a separate control channel. In a DOCSIS 3.0 system, the indication may take the form of a DOCSIS REG-ACK message if a channel is not acquired during registration, a DBC-RSP message if the channel is not acquired during Dynamic Bonding Change, or a CM-STATUS message if a channel becomes unusable during normal operation.

At 420, the CMTS increments a partial service mode counter for each affected channel in response to the indication of the partial service mode. The partial service mode counter may be stored in RAM 260 and may be adjusted by microprocessor 220. The partial service mode counter may be implemented as a separate count of partial service mode CMs that can be added to the active modem count for a total, or a total count of the combined number of active and partial service mode CMs.

At 430, a load balancing trigger is detected. In the case of a system with scheduled periodic load balancing, the trigger may be generated by a timer. The timer may be a process executed by processor 220. In other systems, the trigger may be related to utilization, modem count imbalances, or other indicators.

At 440, one or more differences are computed between the number of CMs associated with a channel and counts related to one or more other channels. Various difference calculations may be used. For instance, the difference may be computed as a difference between the modem count of the relevant channel and one other channel or an average modem count for all channels related to an LBG, or perhaps a difference between the modem count of the relevant channel and the minimum of the modem counts for the other channels in the LBG. In one implementation, the maximum and minimum modem counts for the relevant channels are determined and the difference between them used in the assessment.

At 450, if the difference in the counts of CMs, where the counts include the partial service mode CMs, exceeds a threshold, the algorithm proceeds to 460 and load balancing is performed. It should be noted that 450 may be equivalently implemented as a check of whether the difference meets or exceeds the threshold with the corresponding selection of a higher threshold. Furthermore, the decision may be equivalently considered in the opposite sense, wherein load balancing is deferred if the difference is below a threshold.

It should be noted that the load balancing itself may involve any set of two or more channels in the LBG. For instance, in one implementation, load balancing, once triggered, may potentially impact allocation of modems across all channels in the LBG. In other cases, the load balancing may simply move modems from the most heavily loaded channel to the least heavily loaded channel.

If the difference in modem count does not exceed a threshold when the partial service modems are considered, it could be counterproductive to rebalance. The partial service mode modems are expected to eventually recover and begin to pass data evenly on all of their upstream channels, causing the channels to go back to the balanced condition. Thus, if the difference threshold is not exceeded, rebalancing is delayed and the algorithm then returns to 430 to await the next trigger.

The method of FIG. 4, described above, is applicable particularly to systems where load balancing is based on modem counts. The method serves to prevent load balancing when the difference in counts of active modems is based upon the inactivity of modems in partial service mode, which are expected to return to active service in the near term, rather than upon a difference in the expected longer-term modem counts.

Balancing modem counts, however, will not always produce balanced utilization of channels. Therefore, in some systems, load balancing is performed not based upon differences in modem counts, but upon differences in data utilization. As above, modems in partial service mode may also impact whether load balancing should be performed or deferred in a system based upon utilization.

In such systems, modems in partial service mode may lead to an appearance that a channel is underutilized, when in fact the modems are likely to resume communications on the channel in the near term. Moving modems to such a channel could lead to counterproductive load balancing, unnecessary modem moves, and disruption of communications. Thus, a modified method, described below, is desirable for such systems.

Figure 5:
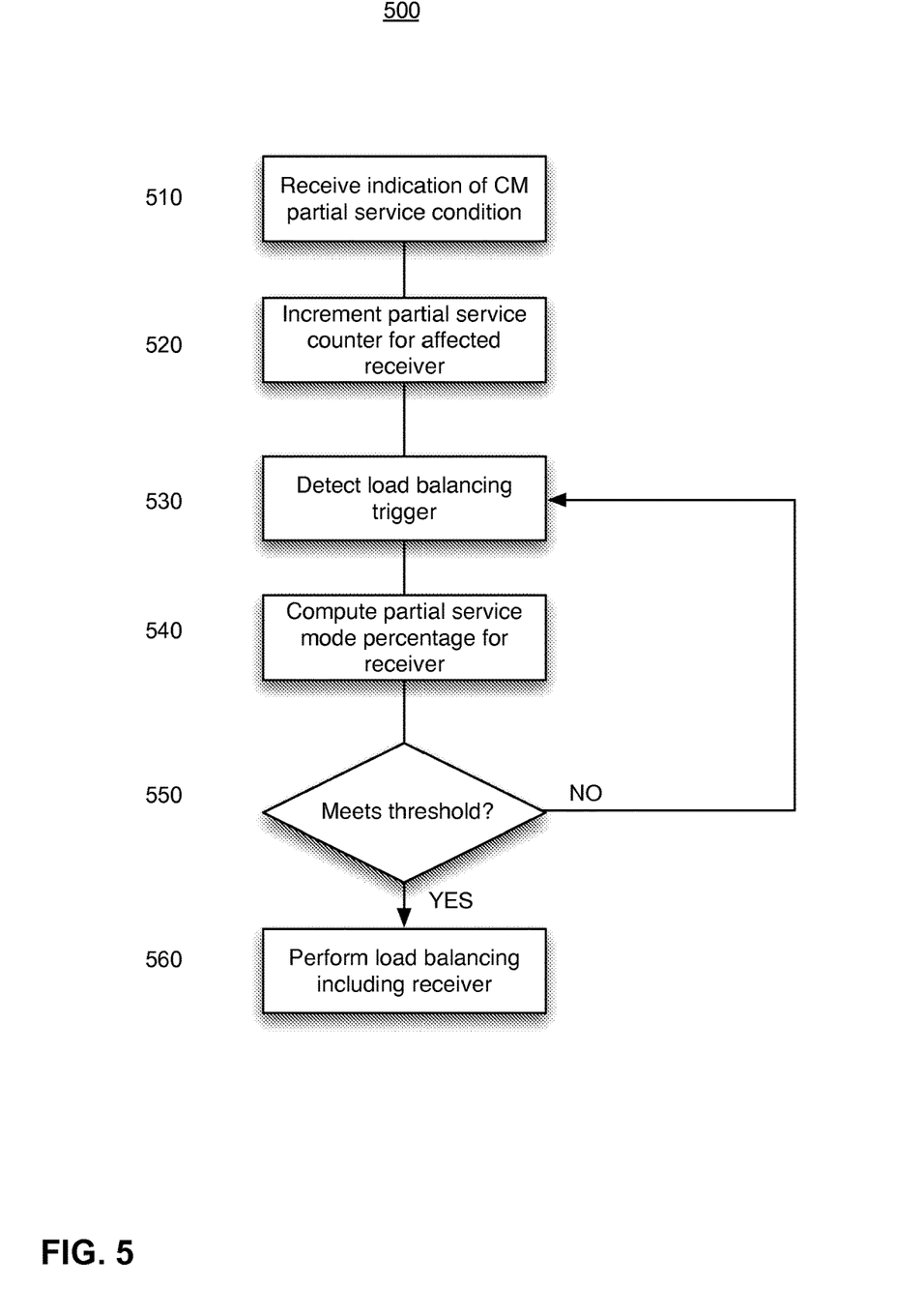
FIG. 5 is a flowchart of a method for controlling the load balancing of a set of modems by balancing utilization, wherein the method accounts for modems in partial service mode.

FIG. 5 is a flowchart of such a method 500 wherein load balancing is deferred for a channel until the percentage of modems in partial service mode is below a threshold, or, equivalently, the percentage of active modems is above a threshold. The method may be performed within a CMTS 120, or particularly within an upstream module 200, a downstream module, or a combined upstream/downstream unit. Program code for the method may be stored on ROM 240 and/or RAM 260, and may be executed by microprocessor 220.

At 510, the CMTS receives an indication of a partial service mode for one of the modems. The indication may be received directly from the modem, as described above, due to detection by the modem of any inability to communicate effectively on one or more of its channels. In a DOCSIS 3.0 system, the indication may take the form of a DOCSIS REG-ACK message if a channel is not acquired during registration, a DBC-RSP message if the channel is not acquired during Dynamic Bonding Change, or a CM-STATUS message if a channel becomes unusable during normal operation.

At 520, the CMTS 120 increments a partial service mode counter for the relevant channels in response to the indication of the partial service mode from the CM. The partial service mode counter may be stored in RAM 260 and may be adjusted by microprocessor 220. The partial service mode counter may be implemented as a separate count of partial service mode CMs that can be added to the active modem count for a total, or a total count of the combined number of active and partial service mode CMs.

At 530, a load balancing trigger is detected. In the case of a system with scheduled periodic load balancing, the trigger may be received from a timer process. The timer may be a process executed by processor 220. In other systems, the trigger may be related to utilization or other indicators.

At 540, the percentage of CMs in partial service mode for the channel of interest is calculated. If a large percentage of CMs are in partial service mode, the utilization metrics for the channel are likely to be misleading. CMs that will likely be communicating on the channel in the near future are not presently communicating. Thus, moving CMs to the channel based on the temporary underutilization could be counterproductive.

At 550, if the percentage of CMs in partial service mode is below a chosen threshold, the algorithm proceeds to 560 and load balancing is conducted with the relevant channel included. For instance, if a 10% threshold is used, load balancing would be allowed for a channel where fewer than ten of a total of one hundred CMs were in partial service mode. The threshold percentage is an implementation decision and could be based on average utilization statistics of modems.

In other cases, the partial service mode metric may exceed the threshold. In these cases, it could be counterproductive to rebalance since the partial service CMs should eventually recover and resume communications on all of their channels, causing the channels to go back to a more balanced condition. Thus, in those cases, the algorithm returns to 530 without rebalancing the channel and awaits the next trigger. For instance, if a 10% threshold is used, load balancing would be deferred for a channel where one or more of a total of eight modems were in partial service mode.

In certain embodiments, the load balancing algorithm may equivalently compute the percentage of CMs that are not in partial service mode and require that the percentage exceed the threshold for rebalancing to occur. In some embodiments, load balancing will also be contingent upon a minimum utilization level regardless of the differences in utilization, or other conditions.

The methods of FIG. 4 and FIG. 5 may also be performed by the apparatus of FIG. 2. The receivers 270 may receive an indication of a partial service mode for a modem. Responsive to the indication of a partial service mode for the modem, processor 220 may increment a first partial service mode counter for channel associated with the partial service mode indication, compute a first partial service mode metric based in part upon the partial service mode counter, and responsive to a determination that the partial service mode metric meets a threshold, determine an allocation of modems to channels, including the first channel associated with the partial service mode indication. The indication of a partial service mode for a modem may alternatively be received via network interface 230. Program code related to execution of the method may be stored in RAM 260, ROM 240, or other memory.

While the principles of the disclosed techniques have been described above in connection with specific apparatus, it is to be clearly understood that this description is made only by way of example and not as a limitation on the scope. For instance, the methods described may be applied to load balancing of transmission or reception devices, and may apply to networks other than cable networks. Aspects of each of the described methods may be combined to provide improved load balancing in systems with partial service mode.

The foregoing detailed description has set forth various embodiments of the devices and or processes via the use of block diagrams, flowcharts, and examples. Insofar as such block diagrams, flowcharts, and examples contain one or more functions and or operations, it will be understood by those within the art that each function or operation within such block diagrams, flowcharts, or examples can be implemented individually or collectively by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits or as one or more computer programs running on one or more computers. In addition, those skilled in the art will appreciate that the mechanisms of the subject matter described herein are capable of being distributed as a program product in a variety of forms, and that an illustrative embodiment of the subject matter described herein applies regardless of the particular type of computer readable medium used for distribution.

It is to be understood that the depicted architectures are merely exemplary and that in fact many other architectures can be implemented which achieve the same functionality. In a conceptual sense any arrangement of components to achieve the same functionality is effectively associated such that the desired functionality is achieved.

While particular aspects of the present subject matter described herein have been shown and described, it will be apparent to those skilled in the art that based upon the teachings herein, changes and modifications may be made without departing from the subject matter described herein and its broader aspects, and therefore, the appended claims are to encompass within their scope all such changes and modifications as are within the true spirit and scope of the subject matter described herein.

What is claimed:

1. A method of managing communication with a plurality of modems on a plurality of channels, said method comprising:
receiving an indication of a partial service mode for a first modem of said plurality of modems;
responsive to said indication of said partial service mode for said first modem, incrementing a first partial service mode counter for a first channel of said plurality of channels associated with said partial service mode indication;

computing a first partial service mode metric based in part upon said first partial service mode counter; and responsive to a determination that said first partial service mode metric meets a threshold, determining an allocation of said plurality of modems to said plurality of channels, including said first channel, wherein said first partial service mode metric meeting said threshold comprises a difference between a first modem count, comprising a sum of a count of active modems associated with said first channel and said first partial service mode counter for said first channel, and a second modem count, exceeding a predetermined threshold, and wherein said second modem count is one of: a count of active and partial service mode modems associated with a second channel, an average of a plurality of counts active and partial service mode modems associated with two or more of said plurality of channels, or a minimum count of active and partial service mode modems associated with said plurality of channels.

2. The method of claim 1 wherein computing said first partial service mode metric is performed responsive to detecting a trigger condition for load balancing of said plurality of modems.

3. The method of claim 1 wherein said first modem communicates on said first channel of said plurality of channels using one of a time division multiple access channel access method or a code division multiple access method.

4. The method of claim 1 wherein said first partial service mode metric meeting said threshold comprises a difference between the first partial service mode metric associated with said first channel and a second partial service mode metric associated with a second channel being above a predetermined threshold.

5. The method of claim 1 wherein said second modem count comprises modems in the partial service mode.

6. The method of claim 1 wherein at least one modem of said plurality of modems communicates on at least two channels.

7. The method of claim 1 wherein said determining an allocation of said plurality of modems to said plurality of channels comprises controlling a balance of the plurality of modems among said plurality of channels based on one of: the number of modems in communication on each channel or the data utilization of each channel.

8. The method of claim 1 wherein said partial service mode metric is a percentage of modems associated with said first channel that are in a partial service mode.

9. The method of claim 8 wherein said partial service mode metric meeting said threshold comprises said percentage of modems associated with said first channel that are in a partial service mode being below a predetermined percentage or said percentage of modems associated with said first channel that are not in a partial service mode being above a predetermined percentage.

10. The method of claim 9 wherein said predetermined percentage is between 5% and 15%.

11. The method of claim 1 wherein receiving an indication of the partial service for the first modem comprises receiving a message from a cable modem termination system (CMTS).

12. The method of claim 1 wherein the first modem is at least one of said plurality of modems that communicates on at least two channels.

13. The method of claim 1 wherein the first modem is at least one of said plurality of modems that communicates on said first channel of said plurality of channels using one of a time division multiple access channel access method or a code division multiple access method.

14. An apparatus for communicating with a plurality of modems on a plurality of channels comprising:

a plurality of receivers for receiving data transmitted from said plurality of modems on said plurality of channels or a plurality of transmitters for transmitting data to said plurality of modems on said plurality of channels;

a memory for storing a list of channels available for load balancing; and a processor for:

receiving an indication of a partial service mode for a first modem of said plurality of modems;

responsive to said indication of said partial service mode for said first modem, incrementing a first partial service mode counter for a first channel of said plurality of channels associated with said partial service mode indication;

computing a first partial service mode metric based in part upon said first partial service mode counter; and responsive to a determination that said first partial service mode metric meets a threshold, determining an allocation of said plurality of modems to said plurality of channels, including said first channel, wherein said first partial service mode metric meeting said threshold comprises a difference between a first modem count, comprising a sum of a count of active modems associated with said first channel and said first partial service mode counter for said first channel, and a second modem count, exceeding a predetermined threshold, and wherein said second modem count is one of: a count of active and partial service mode modems associated with a second channel, an average of a plurality of counts active and partial service mode modems associated with two or more of said plurality of channels, or a minimum count of active and partial service mode modems associated with said plurality of channels.

* * * * *